(12) United States Patent
Schoefer et al.

(10) Patent No.: US 11,618,190 B2
(45) Date of Patent: Apr. 4, 2023

(54) INJECTOR, INJECTION-MOLDING TOOL, AND METHOD FOR MANUFACTURING AN INJECTOR

(71) Applicant: Robert Bosch GmbH, Stuttgart (DE)

(72) Inventors: Frank-Holger Schoefer, Sachsenheim (DE); Ralf Kromer, Vaihingen (DE); Andreas Glaser, Stuttgart (DE); Lars Wittko, Bamberg (DE); Marcio Dos Santos Trombin, Schwieberdingen (DE); Onur Sahiner, Bamberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 668 days.

(21) Appl. No.: 16/469,886

(22) PCT Filed: Oct. 19, 2017

(86) PCT No.: PCT/EP2017/076702
§ 371 (c)(1),
(2) Date: Jun. 14, 2019

(87) PCT Pub. No.: WO2018/114089
PCT Pub. Date: Jun. 28, 2018

(65) Prior Publication Data
US 2019/0315029 A1  Oct. 17, 2019

(30) Foreign Application Priority Data
Dec. 21, 2016  (DE) .......................... 102016225896.6

(51) Int. Cl.
*B29C 45/14* (2006.01)
*F02M 61/16* (2006.01)
(Continued)

(52) U.S. Cl.
CPC ...... *B29C 45/14065* (2013.01); *B05B 1/3046* (2013.01); *B29C 45/14598* (2013.01);
(Continued)

(58) Field of Classification Search
CPC .......... F02M 61/168; F02M 2200/8046; B05B 1/3046; B29C 2045/0027;
(Continued)

(56) References Cited

U.S. PATENT DOCUMENTS 4,405,912 A * 9/1983 Palma .................... H01F 7/1607
335/278
5,185,919 A  2/1993 Hickey
(Continued)

FOREIGN PATENT DOCUMENTS

DE  1792758 U  7/1959
EP  0342237 A1  11/1989
(Continued)

OTHER PUBLICATIONS

International Search Report dated Feb. 8, 2018 of the corresponding International Application PCT/EP2017/076702 filed Oct. 19, 2017.

*Primary Examiner* — Darren W Gorman
(74) *Attorney, Agent, or Firm* — Norton Rose Fulbright US LLP; Gerard Messina

(57) ABSTRACT

An injector for introducing a fluid includes a main body designed as an insert and including a first tool contact surface for an injection-molding tool and a second tool contact surface for the injection-molding tool; and an injection-molded housing that completely encloses the main body on at least one portion of the main body, the injection-molded housing including at least one first opening that extends linearly towards the main body.

3 Claims, 5 Drawing Sheets

(51) Int. Cl.
*B05B 1/30* (2006.01)
*B29C 45/26* (2006.01)

(52) U.S. Cl.
CPC ....... *B29C 45/2606* (2013.01); *F02M 61/168* (2013.01); *F02M 2200/8046* (2013.01)

(58) Field of Classification Search
CPC .... B29C 45/14065; B29C 2045/14122; B29C 45/14598; B29C 45/14836; B29C 45/2606
See application file for complete search history.

(56) References Cited

U.S. PATENT DOCUMENTS

| | | | | |
|---|---|---|---|---|
| 5,189,782 A | * | 3/1993 | Hickey | F02M 51/005 123/456 |
| 5,312,050 A | * | 5/1994 | Schumann | F02M 61/168 239/585.1 |
| 5,372,313 A | * | 12/1994 | Chabon | F02M 61/168 239/585.1 |
| 5,494,225 A | * | 2/1996 | Nally | F02M 51/061 251/129.21 |
| 5,820,099 A | * | 10/1998 | Rahbar | F02M 61/205 239/585.4 |
| 6,019,128 A | * | 2/2000 | Reiter | F02M 61/165 210/232 |

FOREIGN PATENT DOCUMENTS

| | | |
|---|---|---|
| EP | 879952 A2 | 11/1998 |
| EP | 1790453 A1 | 5/2007 |
| FR | 2556645 A1 | 6/1985 |
| FR | 2638594 A1 | 5/1990 |
| GB | 1433955 A | 4/1976 |
| JP | 2002276501 A | 9/2002 |
| JP | 2002276505 A | 9/2002 |
| WO | 02068812 A1 | 9/2002 |
| WO | 2012007201 A1 | 1/2012 |
| WO | 2013143750 A1 | 10/2013 |

* cited by examiner

INJECTOR, INJECTION-MOLDING TOOL, AND METHOD FOR MANUFACTURING AN INJECTOR

CROSS-REFERENCE TO RELATED APPLICATIONS

The present application is the national stage of International Pat. App. No. PCT/EP2017/076702 filed Oct. 19, 2017, and claims priority under 35 U.S.C. § 119 to DE 10 2016 225 896.6, filed in the Federal Republic of Germany on Dec. 21, 2016, the content of each of which are incorporated herein by reference in their entireties.

FIELD OF THE INVENTION

The present invention relates to an injector for introducing a fluid, in particular for injecting a fuel, and an injection-molding tool for manufacturing the injector. Furthermore, the present invention relates to a method for manufacturing the injector.

BACKGROUND

Injectors are known, for example, as fuel injectors from the related art in different designs. Heretofore, injectors have been provided with an injection-molded housing, which is extruded around an injector main body.

SUMMARY

However, because of the continuous efforts to reduce the size of the components, future injectors will only have a small cross section. It has been found in this case that because of an injection pressure during the injection-molding procedure and a melt pressure, the injector can bend. It can occur in this case that the injector suffers damage as a result of the introduced bending stresses and is no longer functional.

According to an example embodiment of the present invention, an injector for introducing a fluid includes a main body designed as an insert for an injection-molding tool, and an injection-molded housing that completely encloses the main body on at least one portion of the main body. The main body includes a first tool contact surface for an injection-molding tool and a second tool contact surface for the injection-molding tool. Furthermore, the injection-molded housing includes at least one first opening, which is oriented in the direction toward the main body and extends linearly. The first opening is produced in this case during the injection-molding procedure, since a support pin is situated in a cavity of the injection-molding tool to enable a support of the main body during the injection procedure. Possible bending of the main body during the injection procedure is thus avoided.

In an example, the injection-molded housing of the injector preferably includes a second opening, which is oriented in the direction toward the main body and extends linearly. The second opening is provided by a second support pin, which supports the main body at a different position than the first support pin. In this way, a sufficient support of the main body during the injection procedure is also achieved in particular in the case of high injection pressures and/or small cross sections of the main body. A center axis of the second opening is preferably situated at an angle of approximately 90° in relation to a center axis of the first opening. A particularly stable support of the main body is achieved in this way.

Furthermore, the first opening is preferably provided in the injection-molded housing in such a way that the first opening extends up to the main body. This is achieved in that before the beginning of the injection molding, the main body is inserted as an insert into the cavity of the injection-molding tool in such a way that the stop pin contacts the main body.

According to example embodiment, the first opening in the injection-molded housing includes a base having a linear slotted opening on an end of the first opening oriented toward the main body. The base is manufactured, like the injection-molded housing, from the injection-molding material. The base in the opening is preferably an injection-molded material skin and the linear slotted opening results from a linear contact between the stop pin and a curved outer contour of the main body. The free end of the stop pin is preferably provided lying in a plane, so that the linear contact between the stop pin and the main body results in the injection-molding tool.

Furthermore, the present invention relates to an injection-molding tool including at least one first tool half and one second tool half, a cavity being present between the tool halves. The cavity is designed to accommodate an insert, in particular a main body of an injector. A support pin having a pin end is provided on one tool half, the support pin protruding into the cavity between the tool halves. The support pin is designed to be in contact with the insert during the injection procedure in order to support the insert. In this way, bending of the insert because of the high injection molding and/or a melt pressure can be avoided.

The finished injector can be removed after the injection molding by opening the tool halves.

The injection-molding tool according to the present invention is preferably constructed in such a way that the support pin is situated in the first tool half and an inflow opening for supplying the injection-molding material is situated in the second tool half.

The support pin and the inflow opening are particularly preferably arranged in such a way that the support pin and the inflow opening are opposite to each other in the closed state of the injection-molding tool. A particularly good support of the injection-molding pressure, which acts from the inflow opening directly on the insert, can be achieved in this way.

A second support pin is particularly preferably provided, which is situated on the circumference of the insert in such a way that a first center axis of the first support pin is situated at an angle, in particular at an angle of approximately 90°, in relation to a second center axis of the second support pin. A particularly good support is achieved in this way, without the tool becoming excessively complicated and thus costly to manufacture for this purpose.

Furthermore, the present invention relates to a method for manufacturing an injector including a main body and an injection-molded housing. The method includes the steps of inserting a main body into a cavity of an injection-molding tool, the injection-molding tool including at least one first support pin that protrudes into the cavity and that is designed to be in contact with the insert during the injection procedure to support the insert against the injection pressure and/or the melt pressure.

In the method according to the present invention, the support pin can first come into contact with the insert during the injection procedure or alternatively the support pin is already in contact with the insert even before the start of the injection procedure. If a distance is present between the insert and the support pin, the distance is selected in such a way that only minimal bending of the insert is possible due to the injection pressure.

If the insert is already in contact with the support pin before the injection procedure, the support pin is preferably in contact with the insert in such a way that a pre-tension is exerted on the insert, which is directed against the pressure direction of the injection pressure during the injection procedure. In this way, in particular at very high injection pressures, a deformation of the insert can be avoided, since the pre-tension exerted by the support pin and slight deformation of the main body is compensated for as a result of the very high injection pressure.

The present invention is used in particular in the case of fuel injectors for injecting liquid fuel.

Preferred example embodiments of the present invention are described in detail hereafter with reference to the appended drawings.

DETAILED DESCRIPTION

Figure 1:
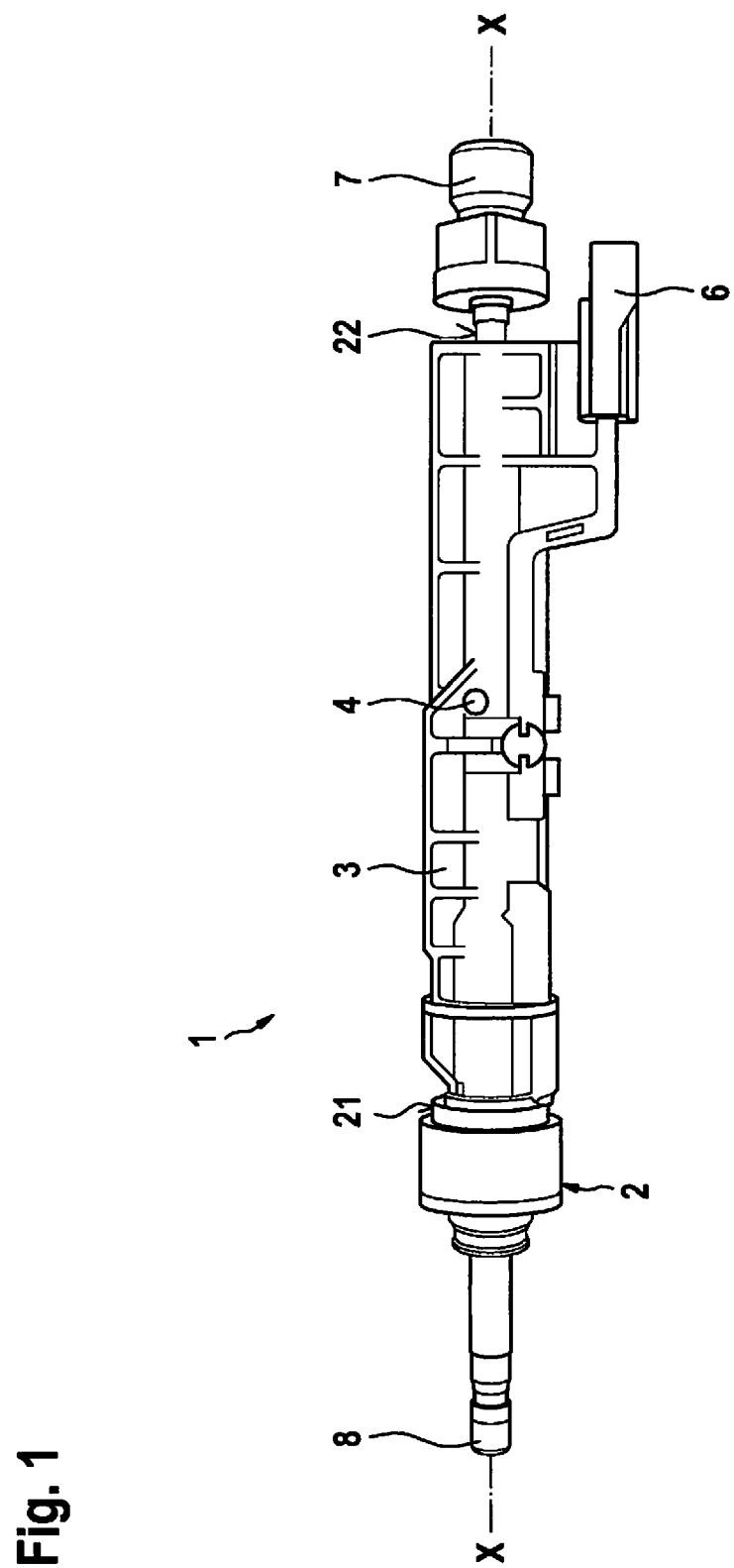
FIG. 1 shows a schematic view of an injector according to an example embodiment of the present invention.

Example embodiments of the present invention, are directed to an injector 1, an injection-molding tool, and a manufacturing method for the injector. FIG. 1 schematically shows a side view of an example injector 1, which is, for example, a fuel injector for injecting liquid fuel.

Injector 1 includes a main body 2, which includes a metallic valve housing, in which an actuator, for example, a magnetic actuator, and a closing element, for example, a valve needle or the like, are situated. The injector injects fuel, for example, directly into a combustion chamber at end 8 of the injector opposite to a fuel connection 7.

In addition to main body 2, injector 1 includes an injection-molded housing 3. Injection-molded housing 3 is preferably manufactured from a plastic material. Injection-molded housing 3 furthermore preferably includes an electrical plug connection 6, via which a power supply and control of injector 1 take place.

A first opening 4, which is cylindrical in this example embodiment, is provided in injection-molded housing 3. First opening 4 extends completely through injection-molded housing 3 up to the outer jacket of main body 2. As is apparent from FIG. 1, first opening 4 is perpendicular to a center axis X-X of the injector.

Figure 2:
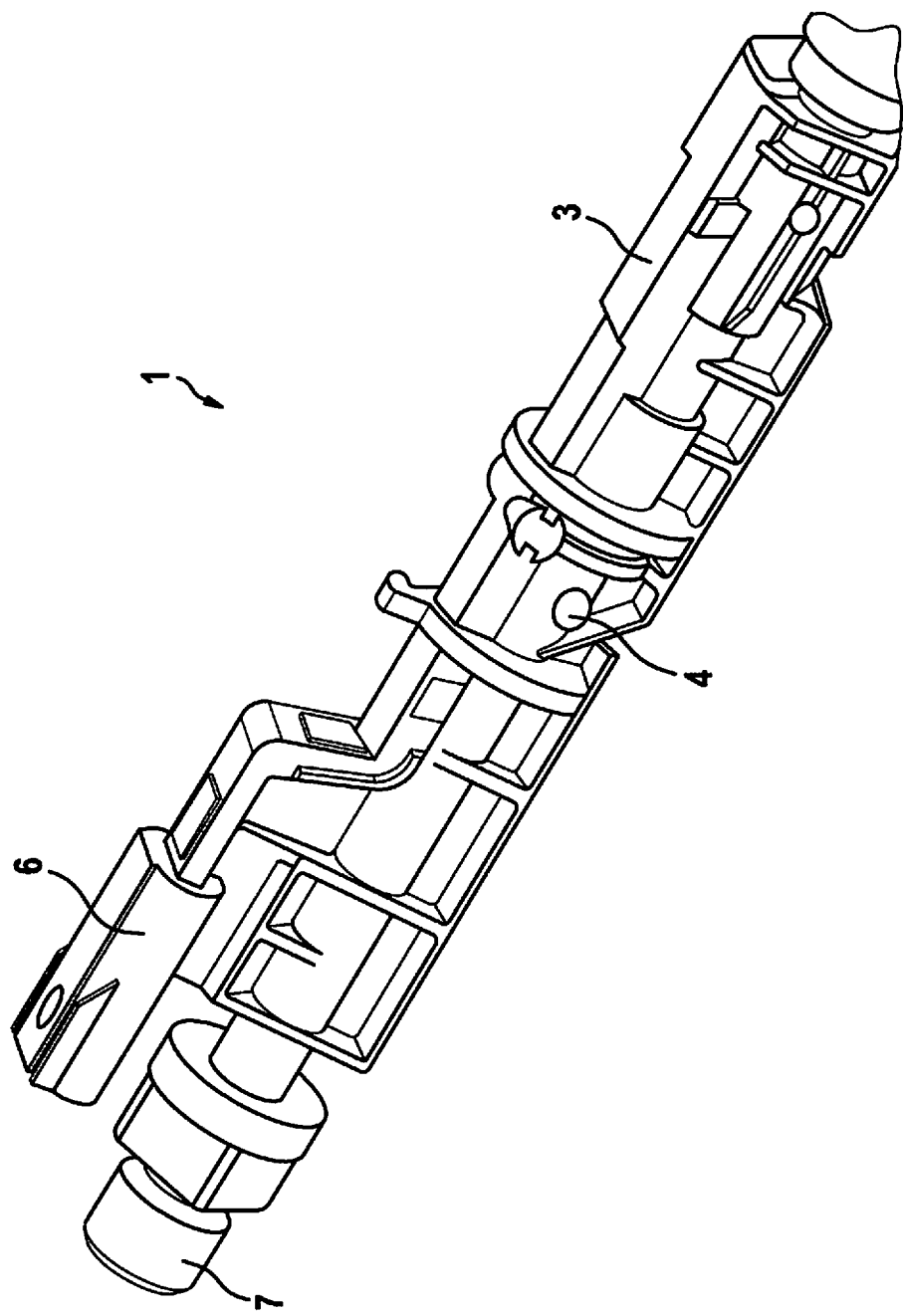
FIG. 2 shows a schematic perspective view of the injector of FIG. 1 from a first direction, according to an example embodiment of the present invention.
Figure 3:
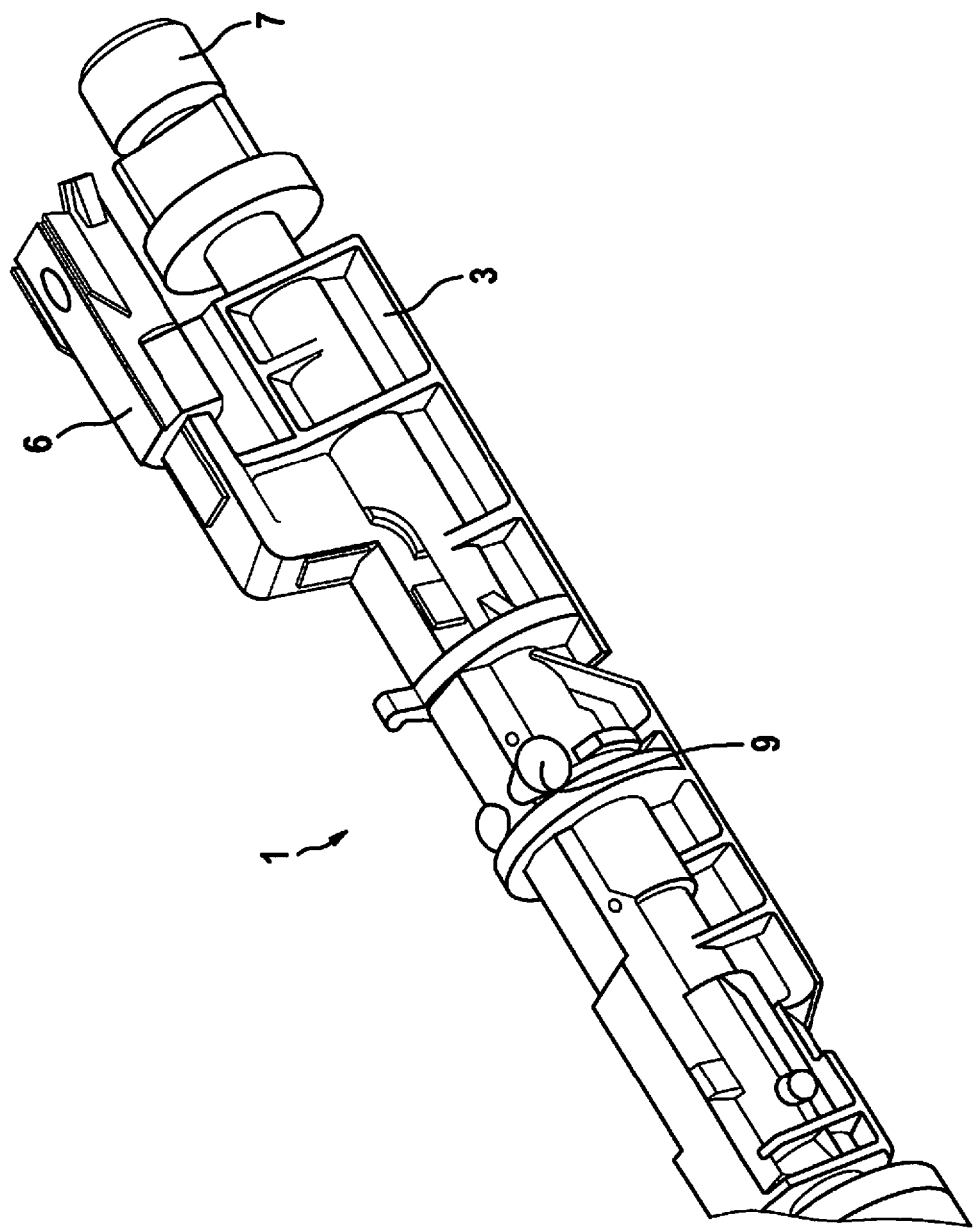
FIG. 3 shows a schematic perspective view of the injector of FIG. 1 from a second direction, according to an example embodiment of the present invention.

As is apparent from FIGS. 2 and 3, injection-molded housing 3 completely encloses a middle part of main body 2 in the circumferential direction of the main body.

Furthermore, a first tool contact surface 21 and a second tool contact surface 22 are provided on main body 2 of the injector. As is apparent from FIG. 1, first and second tool contact surfaces 21, 22 delimit the expansion of injection-molded housing 3 in axial direction X-X. An injection-molding tool 30, which is described hereafter with reference to FIGS. 4 and 5, rests against the two tool contact surfaces.

Figure 4:
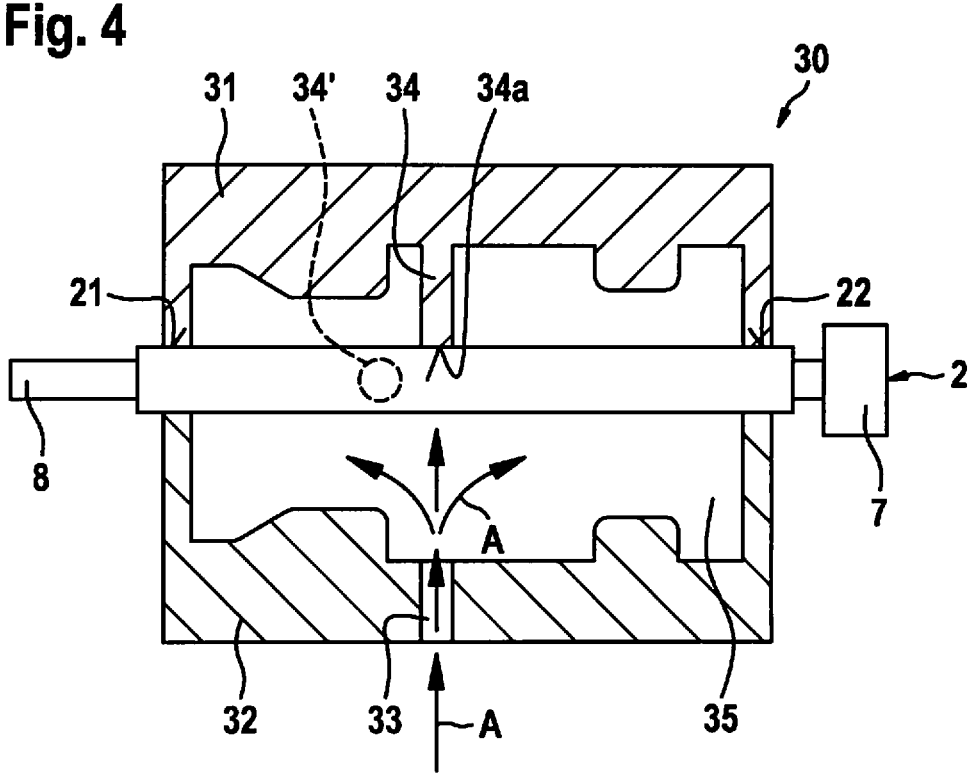
FIG. 4 shows a schematic sectional view of an injection-molding tool in a closed state, according to an example embodiment of the present invention.
Figure 5:
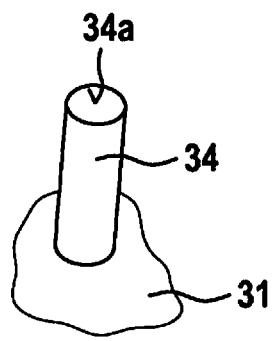
FIG. 5 shows a schematic detailed view of a support pin of the injection-molding tool of FIG. 4, according to an example embodiment of the present invention.

As is apparent from FIG. 4, injection-molding tool 30 includes a first tool half 31 and a second tool half 32. An inflow opening 33, via which the injection-molding material is injected into a cavity 35, which results upon the assembly of first and second tool half 31, 32, is provided in second tool half 32. This is indicated by arrows A in FIG. 4.

A cylindrical support pin 34, which protrudes into cavity 35, is provided in first tool half 31. As is apparent from FIG. 4, support pin 34 is used to support main body 2, which is inserted as an insert into injection-molding tool 30, in order to produce injection-molded housing 3 by injection-molding. First and second tool halves 31, 32 form a seal on first and second tool contact surfaces 21, 22, as schematically shown in FIG. 4.

Main body 2, designed as an insert, includes a cylindrical shape in the area of support pin 34. In this way, a free end 34a, which is a planar surface, rests linearly against main body 2. After the injection molding and removal of the two tool halves 31, 32, first opening 4 shown in FIGS. 1 and 2 is thus formed by support pin 34. Because of the linear contact during the injection-molding procedure between support pin 34 and main body 2, a plastic skin results at the end of first opening 4, which includes a slotted opening in axial direction X-X of main body 2.

As is apparent from FIG. 4, support pin 34 is used during the injection-molding procedure to support main body 2 against the injection pressure, which arises due to the injection of the injection-molding material into cavity 35. As is furthermore apparent from FIG. 4, support pin 34 is situated directly opposite to inflow opening 33 for this purpose. In this way, an optimal support of the insert can be achieved. A diameter of cylindrical support pin 34 is preferably equal to a diameter of inflow opening 33.

A gating point 9, which is located on the outer circumference of injection-molded housing 3, is schematically indicated in FIG. 3.

According to an example embodiment of the present invention, a method for manufacturing injector 1 can therefore be carried out very easily and cost-effectively using injection-molding tool 30, and in particular bending of main body 2 of the injector, which is designed as an insert, can be avoided. The following are three alternatives that are possible for this purpose. On the one hand, as described, support pin 34 can contact main body 2 in injection-molding tool 30, as shown in FIG. 4. According to an alternative, there can also be no contact between support pin 34 and inserted main body 2, but rather a very small distance, preferably less than 0.5 mm, particularly preferably less than or equal to 0.1 mm, so that a minimum deflection of the main body during the injection procedure is enabled. This minimal bending does not damage main body 2, however. As another alternative, a pre-tension and thus a deflection of main body 2 against the injection direction through inflow opening 33 can also be enabled by a contact of support pin 34 with inserted main body 2. This deflection against the injection direction can be compensated for by the high pressure during the injection of the injection-molding material, so that an injector having injection-molded housing 3 can be manufactured, which does not have a deflection on main body 2 as a final product.

Figure 6:
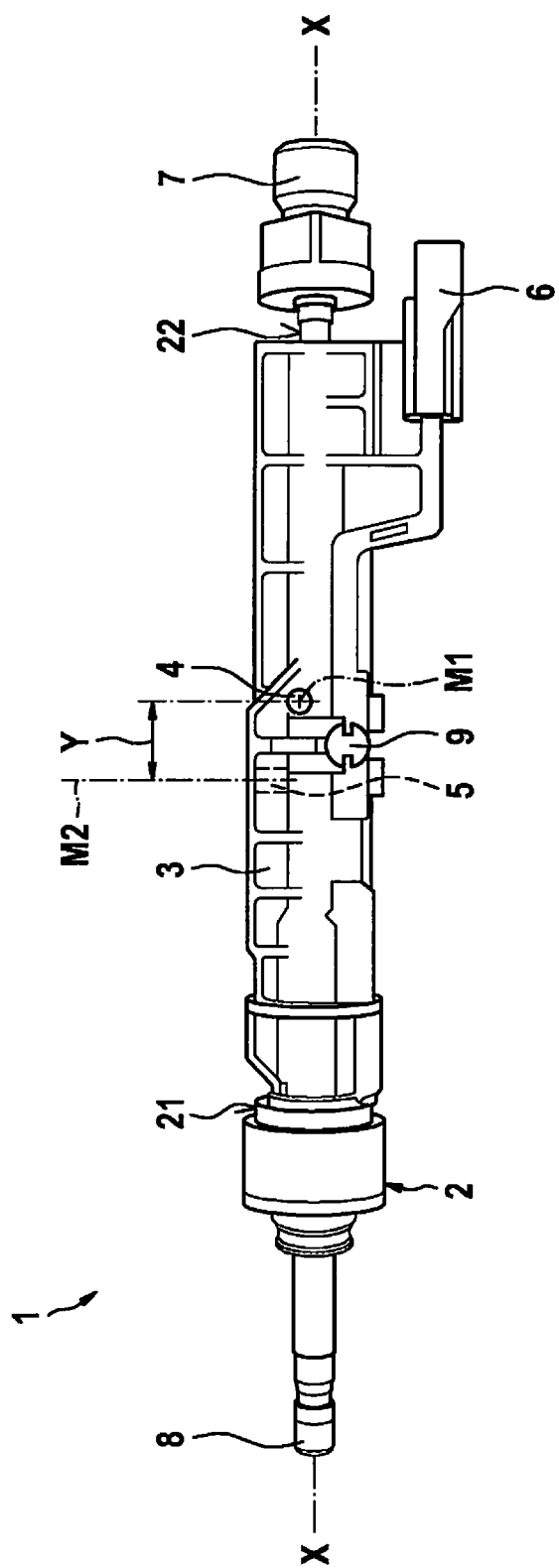
FIG. 6 shows a schematic side view of an injector according to another example embodiment of the present invention.

FIG. 6 shows an injector 1 according to another example embodiment of the present invention. Injector 1 of this example embodiment essentially corresponds to the first example embodiment, a second opening 5 also being provided in injection-molded housing 3 in addition to first opening 4 in injection-molded housing 3. As is apparent from FIG. 6, first and second openings 4, 5 are situated at an angle of 90° relative to each other in injection-molded housing 3. A first center axis of first opening 4 is identified with reference numeral M1 in FIG. 6 and a second center axis M2 of second opening 5 is perpendicular thereto. Both center axes M1, M2 are in turn perpendicular relative to center axis X-X of injector 1.

As is furthermore apparent from FIG. 6, first opening 4 and second opening 5 are situated offset in relation to each other by a distance Y in the direction of center axis X-X of the injector. A gating point 9 is situated between first opening 4 and second opening 5 in axial direction X-X of the injector. As explained in the first example embodiment, first opening 4 and second opening 5 are produced by two support pins, which are provided in the injection-molding tool. An improved support of inserted main body 2 in the injection-molding tool can be achieved by the provision of two support pins, in particular also against a melt pressure that acts on inserted main body 2 during and after the injection procedure. The second support pin is schematically shown by dashed lines with reference numeral 34' in FIG. 4.

What is claimed is:

1. An injector for introducing a fluid, the injector comprising:
    a main body that includes a first tool contact surface for an injection-molding tool and a second tool contact surface for the injection-molding tool; and
    an injection-molded housing that encloses at least a portion of the main body and that includes a first opening that extends linearly towards the main body,
    wherein the injection-molded housing includes a second opening that extends linearly towards the main body of the injector,
    wherein the first opening and the second opening are situated at an angle of 90° relative to each other,
    wherein the first opening and the second opening are situated offset in relation to each other in a direction of a center axis of the injector.

2. The injector of claim 1, wherein the first opening extends up to the main body.

3. The injector of claim 2, further comprising an injection-molded material skin (a) in which there is a linear slot that is parallel to the center axis of the injector and (b) that is positioned on an end of the first opening closest to the main body.

* * * * *